United States Patent
Haynes et al.

(10) Patent No.: US 6,780,316 B2
(45) Date of Patent: Aug. 24, 2004

(54) WATER FILTERING APPARATUS WITH ELEMENT SUPPORT

(75) Inventors: Ronald W. Haynes, Shirley, AR (US); David William Sale, Heber Springs, AR (US); Randall May, Mountain View, AR (US)

(73) Assignee: Professional Dental Manufacturing, Batesville, AR (US)

( * ) Notice: Subject to any disclaimer, the term of this patent is extended or adjusted under 35 U.S.C. 154(b) by 0 days.

(21) Appl. No.: 10/270,082

(22) Filed: Oct. 12, 2002

(65) Prior Publication Data

US 2003/0070968 A1 Apr. 17, 2003

Related U.S. Application Data

(60) Provisional application No. 60/329,278, filed on Oct. 13, 2001.

(51) Int. Cl.⁷ .................................................. B01D 35/04
(52) U.S. Cl. ........................ 210/238; 210/244; 210/282; 210/443; 210/449
(58) Field of Search ................................ 210/244, 232, 210/238, 282, 443, 449, 451, 452, 459, 460

(56) References Cited

U.S. PATENT DOCUMENTS

| | | | |
|---|---|---|---|
| 3,853,761 A | 12/1974 | McClory | |
| 4,352,735 A | * 10/1982 | Turetsky | 210/238 |
| 4,409,848 A | 10/1983 | Lutz | |
| 4,686,037 A | 8/1987 | Lang | |
| 5,071,551 A | * 12/1991 | Muramatsu et al. | 210/266 |
| 5,160,038 A | * 11/1992 | Harada et al. | 210/149 |
| 5,164,082 A | * 11/1992 | Lin | 210/238 |
| 5,197,337 A | 3/1993 | Glasheen | |
| 5,540,107 A | 7/1996 | Silverman et al. | |
| 5,601,710 A | 2/1997 | Yoon et al. | |
| 5,622,618 A | 4/1997 | Brane et al. | |
| 5,935,426 A | * 8/1999 | Giordano et al. | 210/87 |
| 6,001,249 A | 12/1999 | Bailey et al. | |
| 6,024,867 A | 2/2000 | Parise | |
| 6,051,144 A | 4/2000 | Clack et al. | |
| 6,149,801 A | 11/2000 | Giordano et al. | |

* cited by examiner

Primary Examiner—Terry K. Cecil
(74) Attorney, Agent, or Firm—William J. Sapone; Coleman Sudol Sapone, P.C.

(57) ABSTRACT

A drinking water filter assembly has a filter cartridge which includes a filter element contained in a pressure vessel for unitary disposal, the cartridge received on a base containing attachment fittings for ease in installation and replacement with limited exposure to contaminants during a filter change. A flow powered flow meter is provided which measures the quantity of flow through the filter for alerting the user to replace the filter cartridge.

9 Claims, 12 Drawing Sheets

WATER FILTERING APPARATUS WITH ELEMENT SUPPORT

CROSS REFERENCE TO RELATED APPLICATION

This application claims priority in U.S. Provisional patent application No. 60/329,278, filed Oct. 13, 2001.

TECHNICAL FIELD

This invention relates to a water filtering apparatus particularly suited for use in the home. The water filtering apparatus may be counter top or under sink mounted.

BACKGROUND

The quality of drinking water is of concern to those obtaining water from public water systems as well as those obtaining water from private wells. There can be a wide variation in the amount and type of contaminants contained in drinking water, such as those occurring with seasonal runoff, or those present as by-products from water chlorination. To assure individual water quality, local filters may be used for removing contaminants from drinking water, mounted on or under a counter top, or on a faucet. These have gained in popularity.

In U.S. Pat. No. 6,001,249, a water filter system having multiple filters is shown. In U.S. Pat. No. 6,024,867, a counter top water filtering system is shown. In U.S. Pat. No. 5,622,618, a water filter with a flow metering system is described. However, the success of these and other filters for drinking water has been limited primarily because they require periodic user attention to change the filter at the appropriate time. Several of the filters are complex in design, making it difficult for the user to change a filter. Typically, the filter element is a disposable stand alone unit which is placed in a permanent housing which acts as a pressure vessel during the filtration process. Consequently when changing the filter element, the user must remove the housing to expose the filter element and the user is then exposed to a wet, contaminated filter, removal possibly causing some contaminants to dislodge and enter the drinking water after the new filter element is installed.

If not changed at the correct interval, due to inconvenience or otherwise, filtration efficiency could deteriorate to the point where the contaminants begin to pass through into the drinking water.

Consequently, there is a need for a relatively simple water filtering apparatus having the capability for quick and easy change of the filter element, without exposing the user to contaminants or release of the contaminants from the filter element. There is also a need for means to monitor filter usage and to alert a user to timely change the filter element.

SUMMARY OF THE INVENTION

It is object of the present invention to provide a water filtering apparatus that has a simple design.

It is a further object of the present invention to provide a water filtering apparatus with a limited number of parts.

It is a further object of the present invention to provide a water filtering apparatus with a contained filter element to avoid leakage and exposure of the user to contaminants.

It is yet another object of the present invention to provide a water filtering apparatus that has monitoring means to alert the user that the life of the filter is expiring.

These and other objects of the present invention are achieved by a water filtering apparatus comprising:

a base having means for receiving an unfiltered water supply and means for discharging a filtered water supply; and a disposable filter cartridge comprising a container, a filter disposed within the container, the container having means to mate to the means for receiving an unfiltered water supply from the base and having means to mate to the means for discharging the filtered water supply to the base, the container being sealingly received by the base such that water is filtered by the filter element within the container, the filter element and container being a disposable unit.

Using a self-contained filter element avoids the user having to contact a contaminated filter element as the contained filter element and container are disposed of as a unit. The container itself is a pressure vessel, but one of low cost and simple construction, so as to minimize replacement cost. A non-water receiving cover may be used for aesthetic purposes to cover the assembly.

To change a filter element, the self-contained filter element or cartridge is released from the base and a new cartridge mounted in its place. Because it is a simple unit, this can be done without exposing the user to the filtered contaminants, or even wetting their hands.

DETAILED DESCRIPTION OF THE INVENTION

Figure 1:
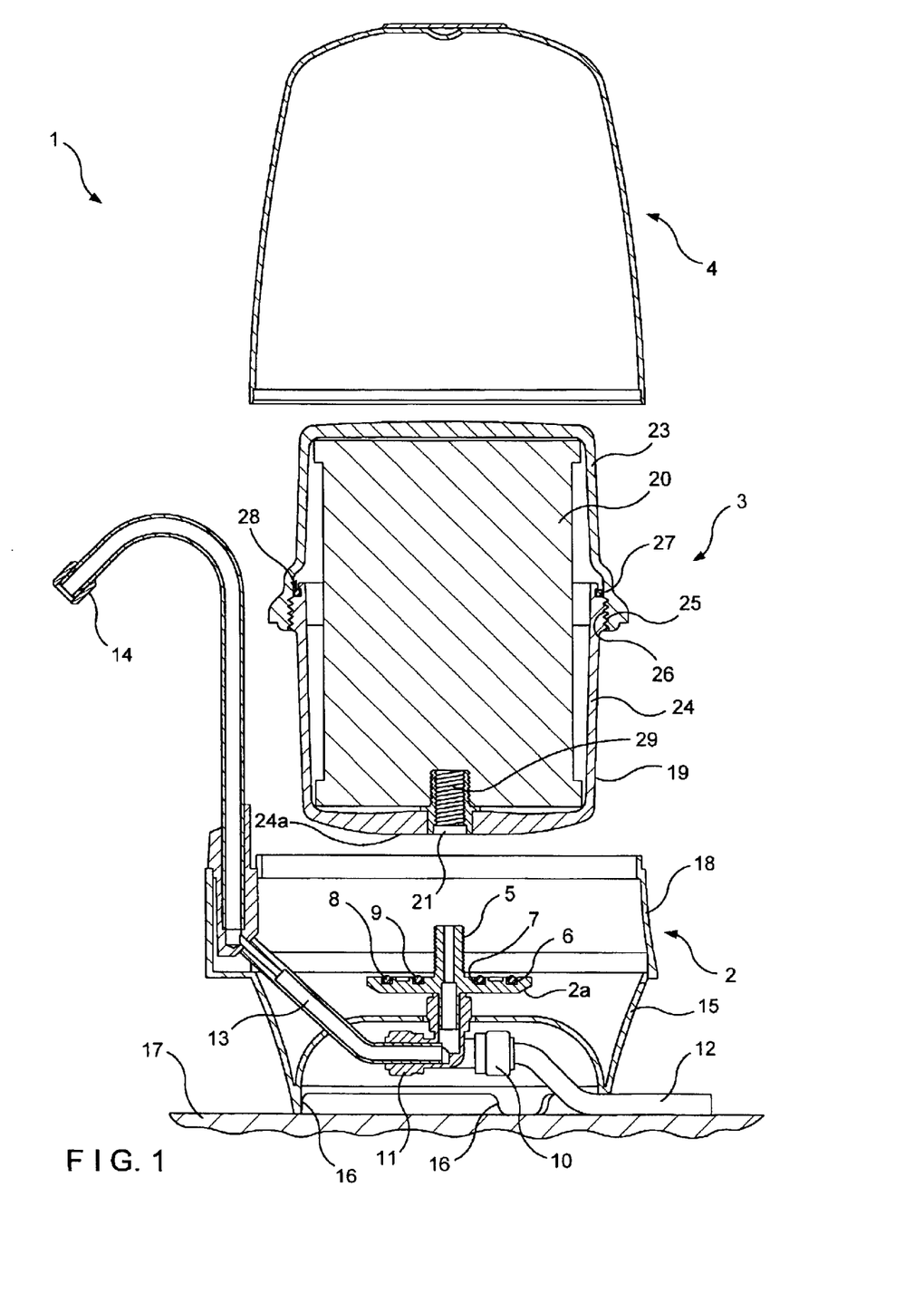
FIG. 1 is an exploded view of a water filtering apparatus according to the present invention.

Referring to FIG. 1, a water filtering apparatus 1 is shown in exploded form. The water filtering apparatus 1 has a base 2, a self-contained, totally enclosed removable filter cartridge 3 and a cover 4. The base 2 has an element support 2a centrally located, and an upwardly projecting connector 5, which may be a threaded pipe end or fitting. The element support 2a has a pair of recesses 6 and 7 which receive respective o-rings 8 and 9. The base has a pair of fittings 10 and 11 which are engaged by a water supply tube 12 and a water discharge tube 13. The discharge tube 13 leads to a spigot 14. The base further has a stand 15 with legs 16 for resting on a surface 17, such as a counter top. A generally cylindrical wall 18 surround the connector 5, having a circumference sized to receive the filter cartridge therein.

The filter cartridge 3 has a container 19 surrounding a filter element 20. The container totally encloses the filter element except for a pair of openings, 21 and 22, best seen in FIG. 2. In this embodiment, the container 19 has an upper half 23 and a lower half 24 that have mateable threaded surfaces 25 and 26 to ease assembly. However, once assembled with a filter element located inside, the container halves are preferably permanently joined and sealed such that the container and element form a cartridge that is a disposable unit. An optional o-ring 27 is used to assure sealing at a joint 28 between the upper and lower halves, though adhesive, joint sealant, welding, fusing or another type of sealing system may be used. Of course, a threaded assembly is shown for illustration and various other constructions for producing a container for surrounding a filter element can be used such as having a non-threaded slip fit between container portions, with adhesive used to form the unitary construction. Another embodiment could provide a container that has a top or bottom added by locking prongs and receiving recesses, threading, bonding, bolting, etc. Regardless of the type of container, after assembly, the container entirely encases the filter element such that it forms a pressure vessel in which filtering occurs.

There are numerous types of filter elements that can be contained such as those designed to remove particulate matter, such as microporous filters, or those designed to remove organic compounds, such as carbon filters. Others may include filter elements incorporating reverse osmosis membranes, ion exchange media, resins, polymers, diatomous earth, etc. Generally, a microporous carbon or ceramic filter with at least one membrane to capture particles and micro-organisms could be used because of its adaptability. However, a carbon filter alone would likely be sufficient in most applications.

The filter element may be sized to be received in the container with a slight interference fit to provide a degree of compression for maintaining the position of the filter element and sealing at the ends such that all water entering the container can only exit after passing through the filter element. However, over compression should be avoided to prevent damage to the filter element or buckling which could produce a leakage path allowing unfiltered water to by-pass the filter element. The threaded container assembly may have an advantage as the degree of compression can be somewhat controlled as the container halves are tightened together.

Figure 2:
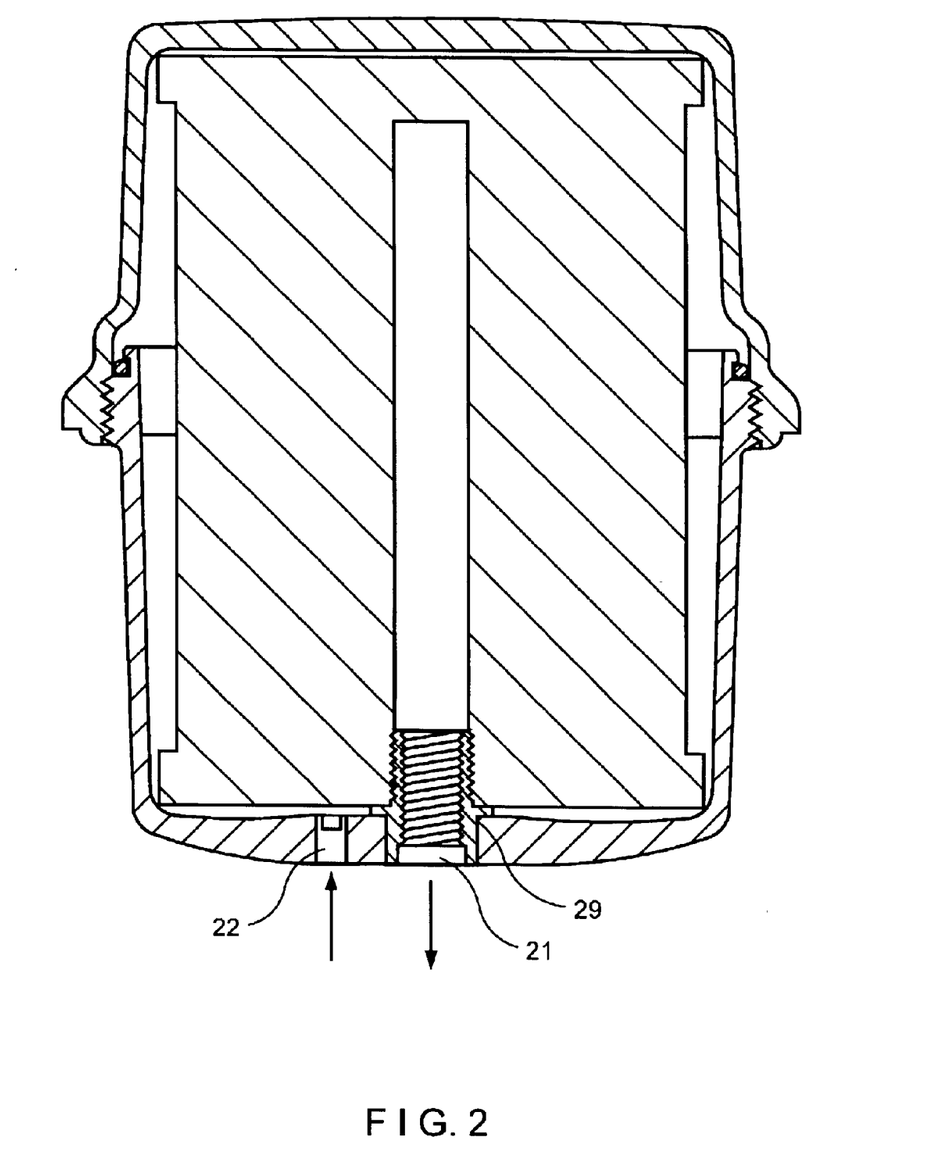
FIG. 2 is a cross sectional view of a replacement filter cartridge.

As described previously, the filter cartridge has two openings, one for unfiltered water to enter and one for filtered water to exit. As shown in FIG. 2, the cartridge has a discharge passage 29, which in this case is threaded, for mating with the threaded connector 5 such that the filter is screwed into place. During assembly, a surface 24a of the container engages the pair of o-rings to provide a seal for the unfiltered water supply therebetween, an annular channel 22a defined between the o-rings to assure that, regardless of the ultimate tightened position of the container, the opening 22 is aligned with the channel and water will flow from the supply fitting to the base into the channel and through the passage 22 into the filter. Only water passing through the filter element is allowed to exit the container through the passage 29.

The water filter assembly 1 has the advantage that it can be used on a counter top or under a sink. During installation or replacement, the user never contacts the filter element as this is encased in the container. An advantage of the inventive water filter assembly is that the connections between the filter cartridge and base are small and thus more easily sealed. (See FIGS. 9a and 9b) This also provides a mechanical advantage as twisting the cartridge during engagement of the small threaded assembly generates more torque at the connection point, to assure a positive seal at the o-rings.

It may be preferred to use a filter element of carbon block with paper wrapping and having plastic molded ends, for low cost contaminant removal. Also, the threaded passage 29 can be provided by using a metal insert which is press fit into the bottom housing 24, which may be made of plastic.

Figure 3:
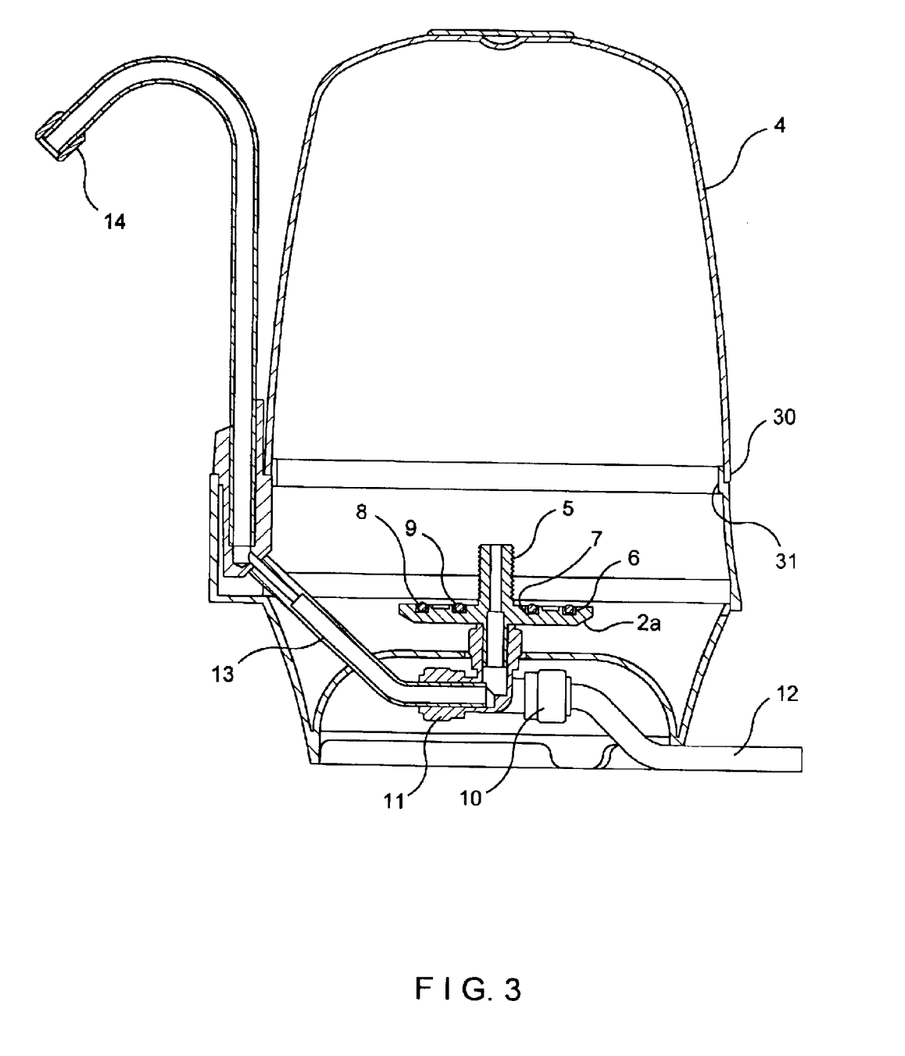
FIG. 3 is a cross sectional view of the water filtering apparatus for use on a counter top, shown without the filter cartridge for ease in illustration.

Referring to FIG. 3, the optional cover 4 has an end 30 which is received by a portion 31 of the cylindrical wall so as to cover the filter cartridge 3, to protect the filter cartridge and improve the aesthetic appearance of the water filtering assembly. However the cover is optional, since it does not receive any water and cannot contribute to filtering, and an aesthetically designed cartridge container with a corresponding aesthetically designed base could provide the same appearance value without the use of a cover.

Quick connect couplings 10 and 11 are preferably used to connect the supply tubing 12 and discharge tubing 13 to the base to ease assembly, as again, the object is to provide a water filter apparatus that is simple in design, construction, installation and operation.

The output tube 13 is pressed into the quick connect fitting on one end and is pressed on or clamped to a fitting on the other end leading to the spigot 14. The input tube is pressed into the quick connect fitting 10 at the filter and is attached to the water supply at the other end by clamping, threading, etc., depending on the supply piping and available or installed fittings. The two quick connects thus mate to the element support 2a in the base which receives the housing.

Figure 4:
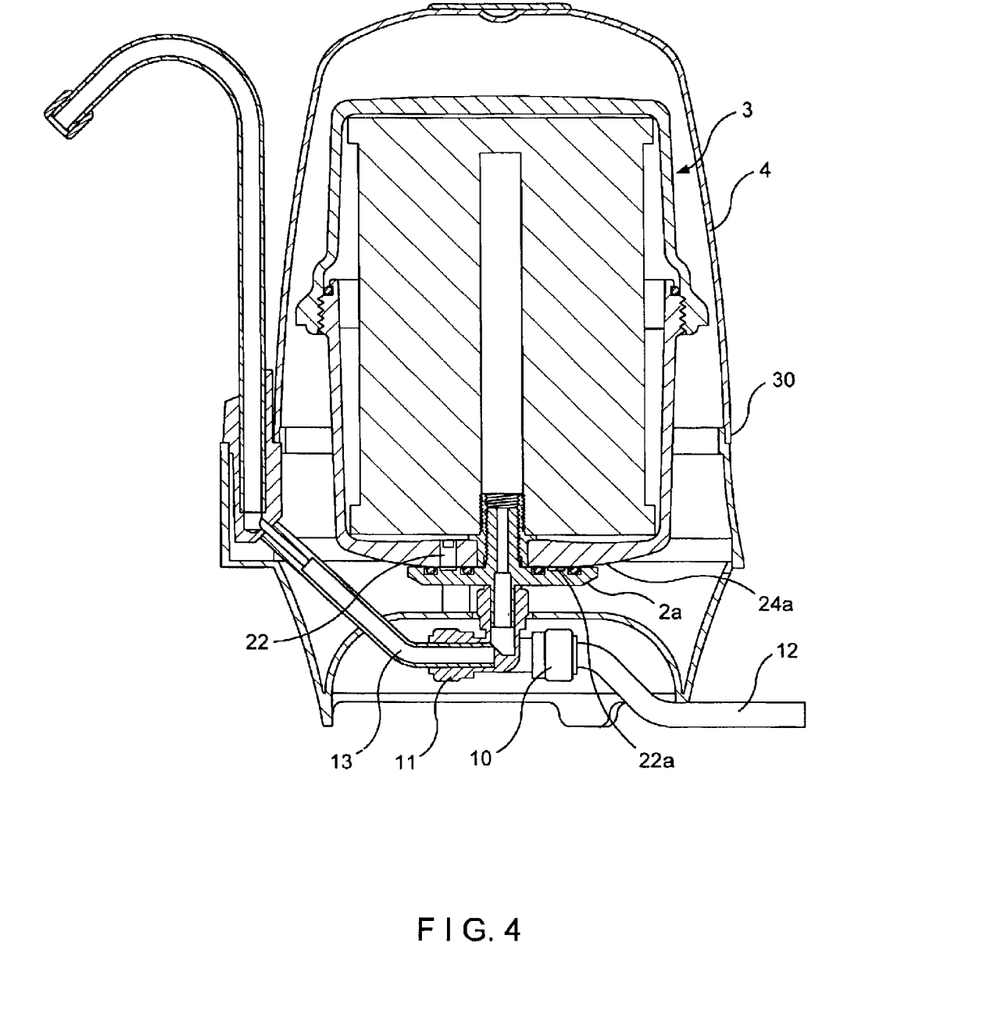
FIG. 4 is cross sectional view of the assembled water filtering apparatus of FIG. 3 with the filter element installed.

FIG. 4 is similar to FIG. 3, except the filter cartridge is mounted on the element support 2a. The cover is engaged with the base to provide protection and appearance value to the water filter assembly.

Figure 5A:
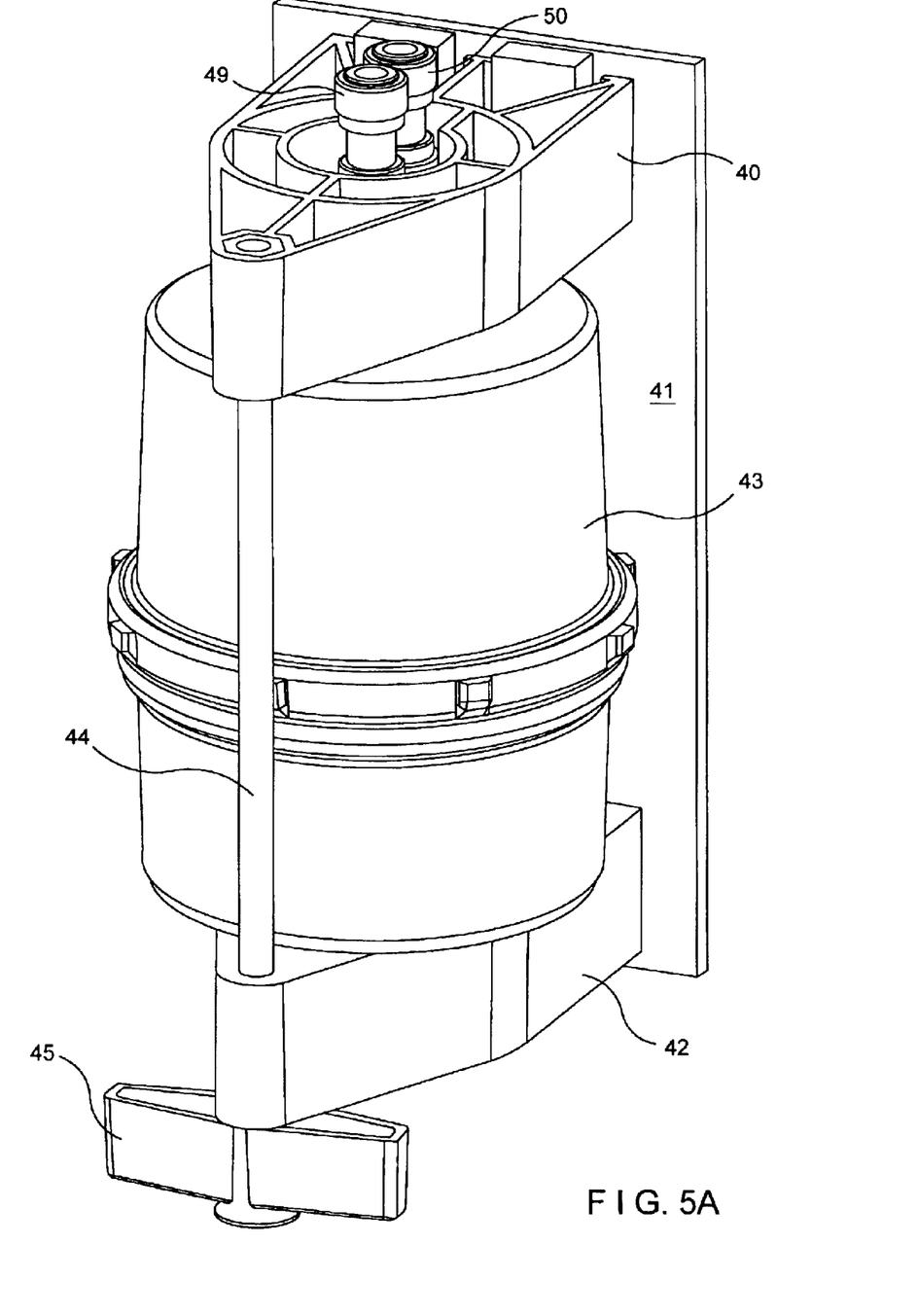
FIG. 5a is a view of an alternative under sink type embodiment of the invention.
Figure 6:
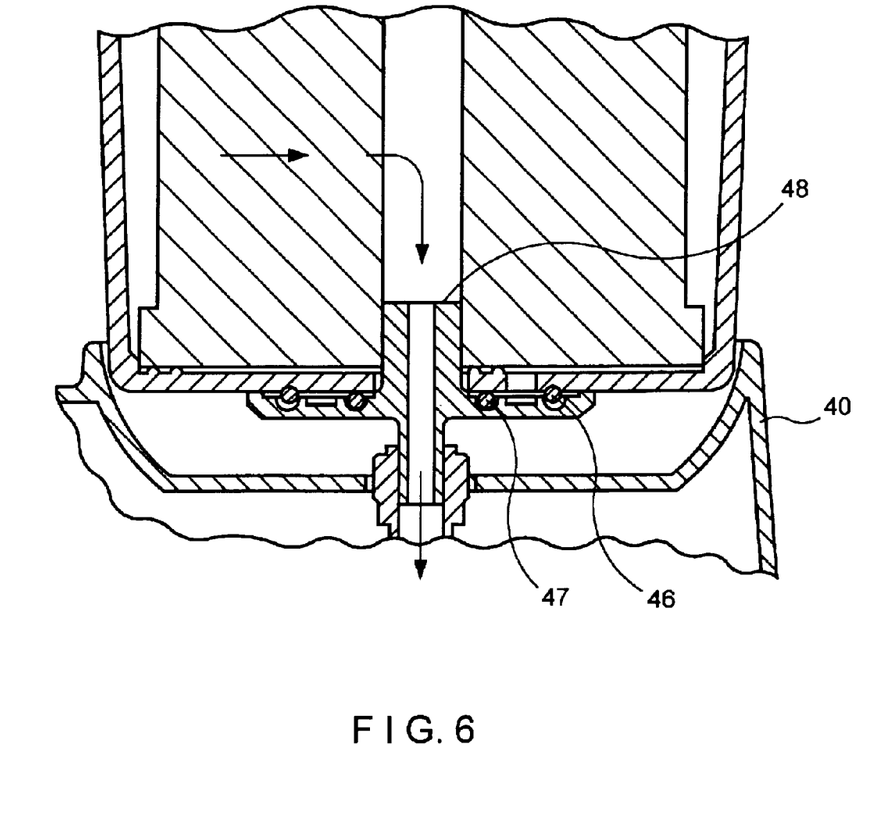
FIG. 6 is a sectional cross sectional view of the engagement of the base by the filter element.

Referring to FIG. 5a, another embodiment of the present invention is shown, adapted for under counter use, though the previous design could also be used under the counter as well. In this embodiment, wall mounting is possible. A base 40 is connected to a wall 41 by having a moveable support 42 on which a self-contained filter cartridge 43 rests. No cover is necessary for the under sink design but one may be used for aesthetic purposes. The support 42 is engaged to the base 40 by a rod 44 having a handle 45. Thus, in this embodiment, instead of a threaded connection, the filter cartridge is disposed between the movable support and the base so compression is applied by the support 42 as the handles 45 is tightened, to seal the filter cartridge against the two o-rings 46 and 47 as shown in FIG. 6. Loosening the handle allows the filter cartridge to be removed without twisting, as it simply slips off an un-threaded pipe 48 in the base. Tightening the handle forces the filter cartridge to engage and compress the o-rings which is sufficient to seal the fluid flow passages.

The base 40 has a pair of threaded coupling points, 49 and 50 for engaging a supply tube and a return tube, not shown. The assembly can thus be somewhat remotely located for convenient servicing.

Figure 5B:
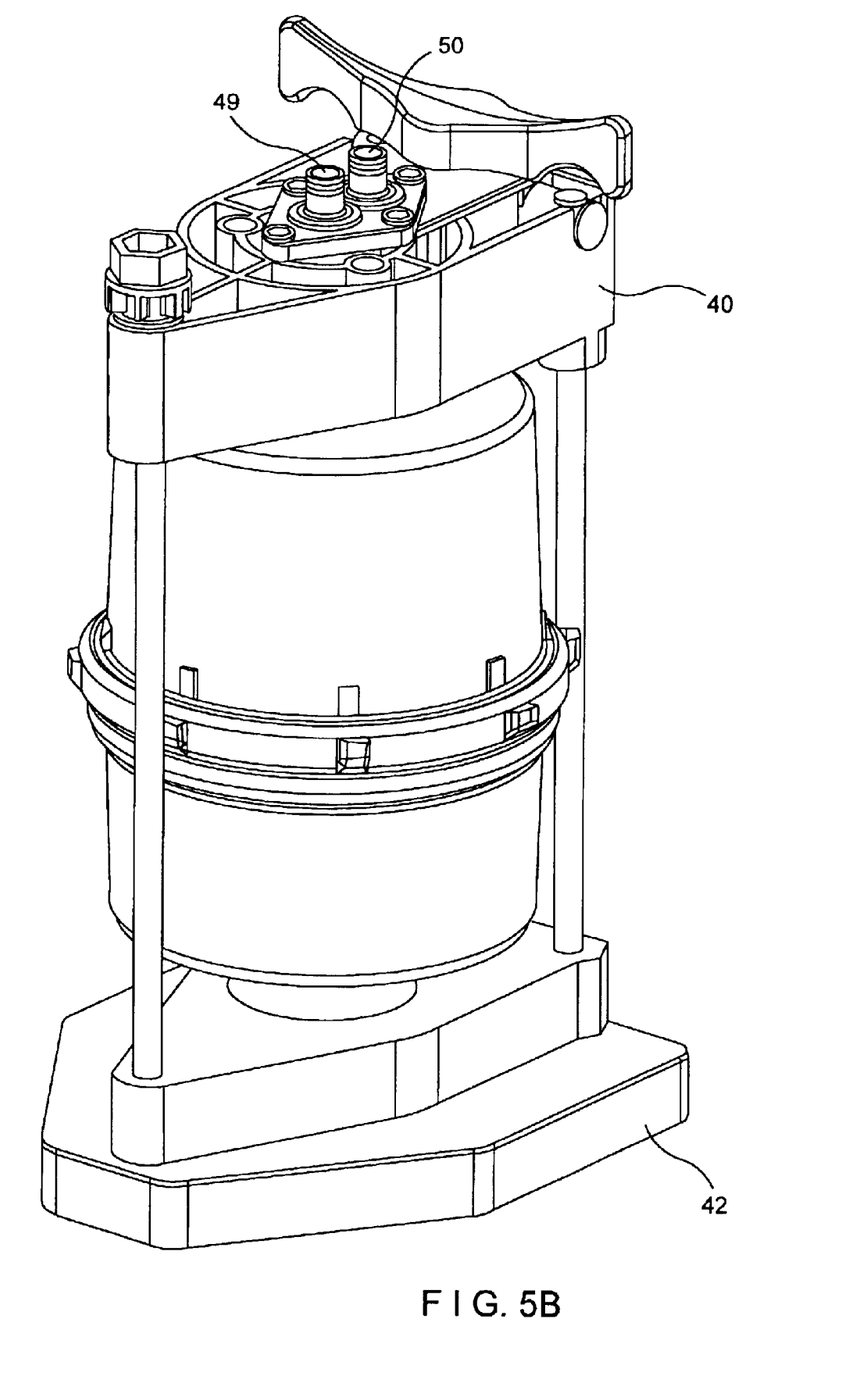
FIG. 5b being another under sink embodiment of the invention.

FIG. 5b shows a similar mounting arrangement, but here, the filter cartridge rests on a floor support 42 and the base has the handle associated with it, though the operation is essentially the same.

Figure 7:
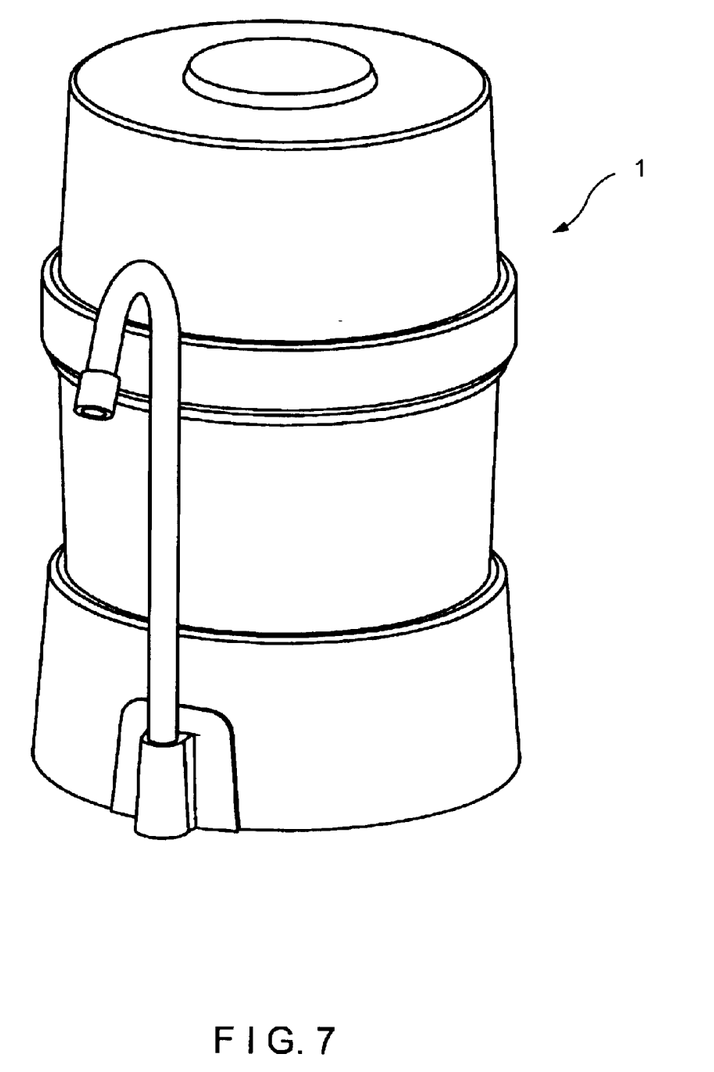
FIG. 7 is a perspective view of the inventive water filter apparatus.

Referring to FIG. 7, a perspective view of the water film assembly 1 is shown without the optional cover.

A particular problem with water filters is the need to timely change the filter element. The life of a filter is dependant on the quantity of fluid flow through the filter and level of contaminants. However, fluid flow is difficult to monitor in a cost effective manner, and most systems rely on periodic filter replacement, for example on a semi-annual or quarterly basis. Of course, water usage can vary significantly from day to day, and periodic replacement risks disposing of a filter which still has adequate filtration capacity, or continuing to use a filter which has passed its ability to provide good filtration. However, no simple reliable system for assuring timely changing of a filter element has been available.

Figure 8A:
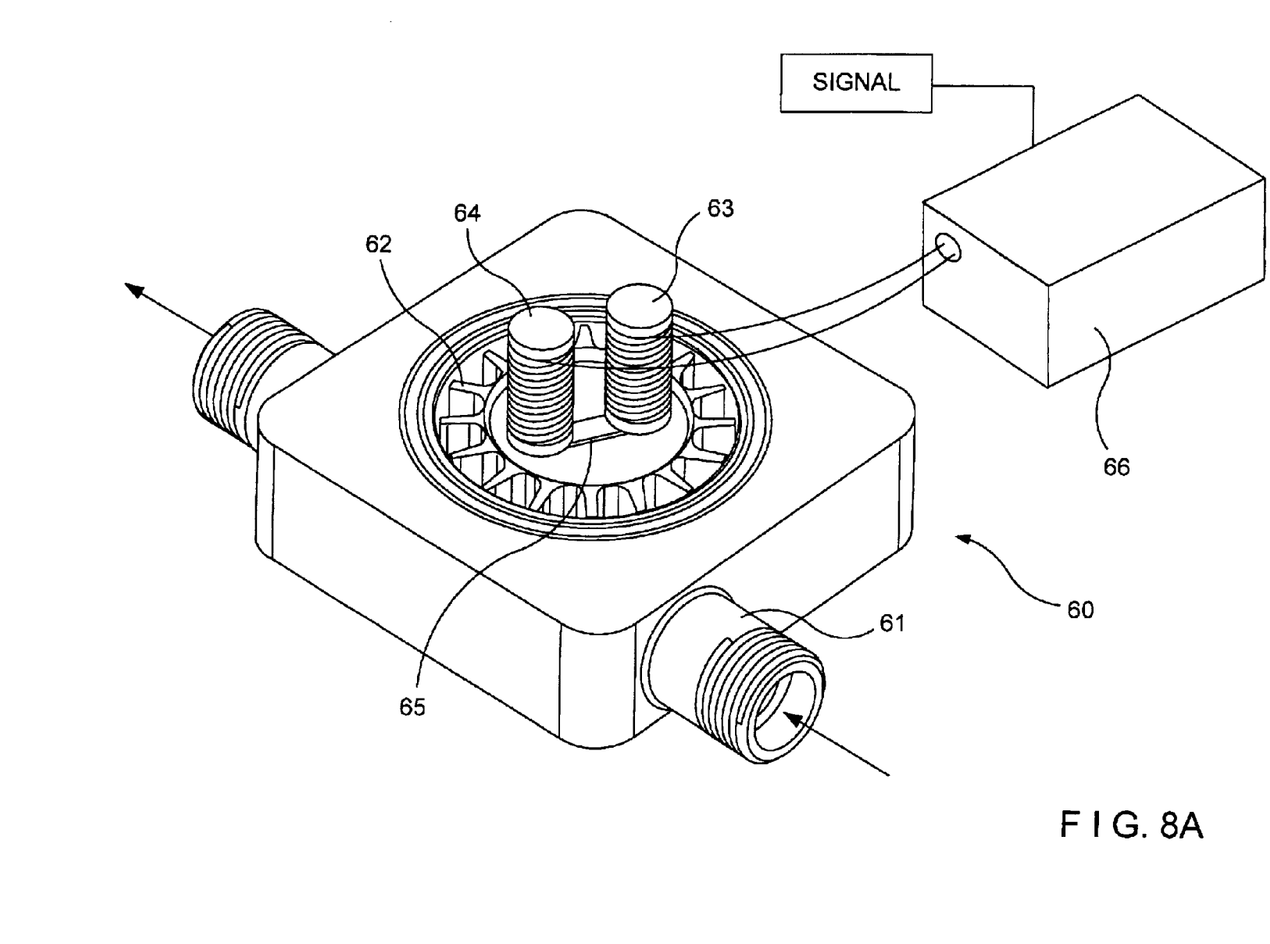
FIG. 8a is an illustrative view of a water filter metering device useable with the present invention.

Referring to FIG. 8a, a water filter counter 60 is shown which can be integrated with the filter base described above, preferably in fluid communication with the water supply piping. As water is directed to the filter, prior to entering the supply tube 12, the water enters an inlet 61, passing by a rotatable impeller 62. Each turn of the impeller represents displacement of a defined volume of fluid, and thus the total number of turns of the impeller, is in direct proportion to the quantity of fluid entering the filter.

The impeller has a stationary magnet 65 that is in proximity to a pair of wire coils 63 and 64, forming a generator such that as the impeller spins electricity is generated. The electricity powers an electronic counter 66, with the power flow from the generator being proportional to water flow, to provide a simple self contained self powered counter which can be preset such that when a given throughput volume is reached, the user is alerted to replace the filter cartridge. The alert can be given using visual, audio or another type of signal. Thus, the life of the filter is tracked by the quantity of fluid delivered to the filter, and the optimum utilization of the filter element is achieved.

Figure 8B:
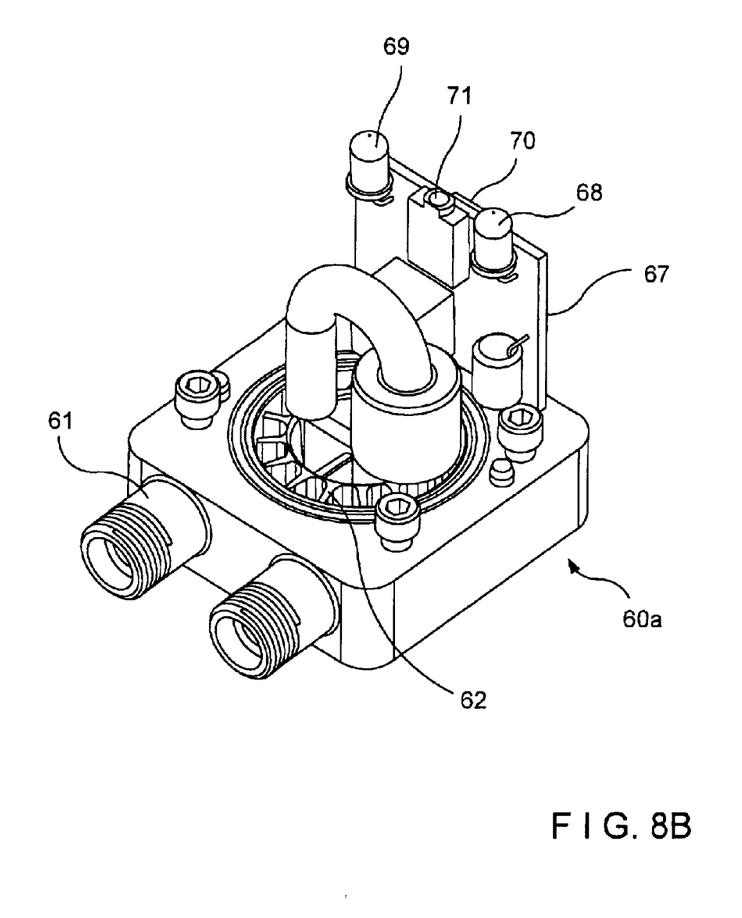
FIG. 8b being another embodiment thereof.

Referring to FIG. 8b, a water filter counter 60a, having a slightly different configuration is shown. The counter 60a has an integrally mounted circuit board 67, red and green lights 68 and 69 for filter status, a reset switch 70 and a connector 71 for remote activation of indicator lights. Thus a compact, self powered flow metering system is provided that is readily adapted to many filter designs, providing high volumetric accuracy at low cost, as no external power supply or battery is required to be used with this unit, though, of course one would be provided.

Figure 9A:
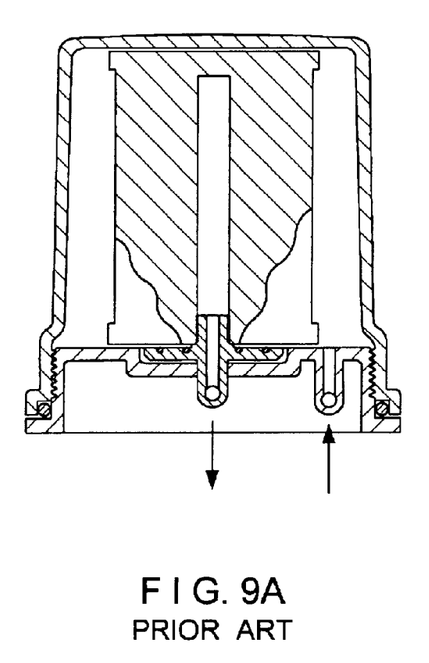
FIG. 9a is a view of a prior art filter, FIG. 9b being a comparative view of a filter according to the present invention.
Figure 9B:
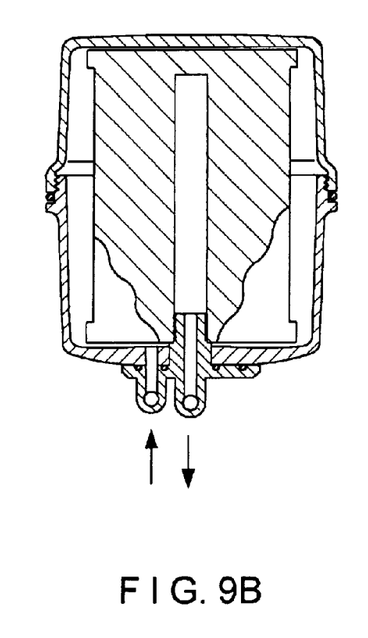

Referring to FIG. 9a, a prior art filter is shown, with FIG. 9b showing the inventive filter cartridge to illustrate the advantages of the present invention, specifically the difference in having a replacement filter element in a large housing that has a wide opening, with the potential for leakage, as well as exposing the user to contaminants during a filter change, verses the inventive disposable cartridge that has only one threaded pipe fitting for fully mating the unitary disposable filter element and housing to the base.

Figure 10:
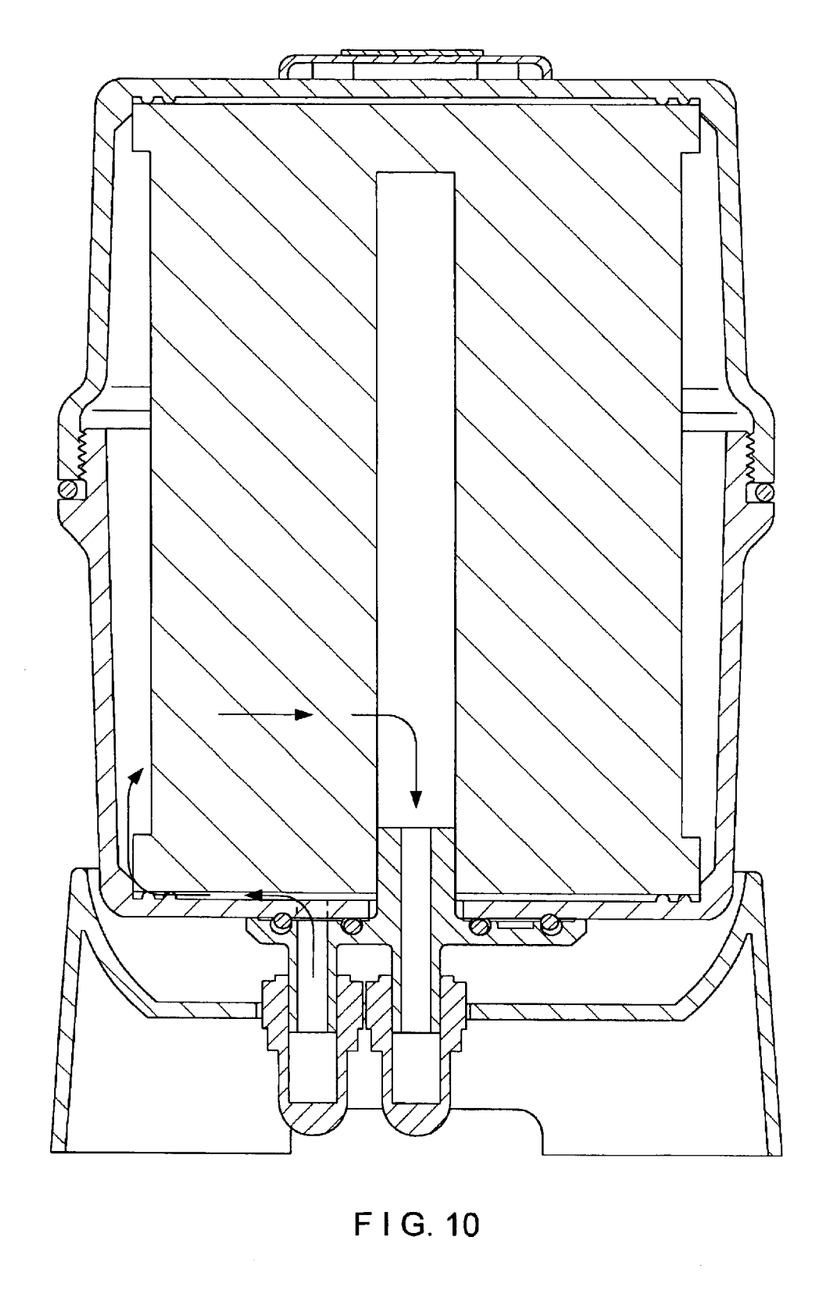
FIG. 10 is another cross sectional view showing the filtration path through the water filter assembly of the present invention.

FIG. 10 is a cross-sectional view of the water filter assembly of the present invention, showing the fluid flow path.

One advantage of the inventive water filter assembly is that two small o-rings seal the fluid passages concentrically to the housing. In addition, the threads engaging the housing to the element support are also relatively small (perhaps 5/8" diameter verses 5–6" dia. with the prior art reusable housing). Thus, there is a mechanical advantage in sealing the housing to the threaded surfaces. As the housing only needs to last the life of the filter (up to about 1 year), the cost of producing a structurally sound housing is reduced. Further, the customer does not have contact with the actual filter element during a filter change, as any contaminants would be contained within the disposable housing.

No tools are required to change the filter, and the change does not result in significant fluid leakage. The user's mechanical advantage is maximized by the difference of the filter assembly's diameter to the sealing o-ring's diameters.

The attachment is preferably obtained using fine pitch metal threads that also increases the user's mechanical advantage. The inlet connection hose can exit the water filter system in any direction because of the swiveled right angle quick disconnect that is used to attach it. The pressure vessel may be hidden with the optional decorative cover. The under counter model preferably consists of a structure that uses compression of the filter assembly to hold it rigidly in position and allow the same filter assembly to be used in an application where greater pressures exist. This allows a more cost effective design for the replacement filter cartridge assembly.

Using the present invention, a simple filtration solution is obtained which enables a user to install a filter system easily, enable filter changes with limited exposure to the contaminated filter element, and without concern for releasing residue in a housing as occurs when only the filter element is removed from the filter assembly.

While preferred embodiments of the invention have been shown and described it will be understood that various changes or modifications can be made without varying from the scope of the invention.

We claim:

1. A water filtering apparatus comprising: a base having an open end for receiving a filter cartridge, an element support disposed within said base and having means for receiving an unfiltered water supply and means for discharging a filtered water supply, one of which is located at a center of the element support;

a disposable filter cartridge consisting of a container, a filter element enclosed within the container, the container having means for mating to the element support and having means for receiving an unfiltered water supply from the element support and means for discharging filtered water supply to the element support, one of which is located at a center of a first end of the container, corresponding to the supply located at the center of the element support and being coaxial therewith, the element support having an annular channel on a top surface thereof in fluid communication with one of the means for receiving the unfiltered water supply and the means for discharging the filtered water supply, first and second annular seals disposed on opposite sides of the annular channel, the first and seconds seals engagable by the first end of the container to seal the annular channel against the first end when the disposable filter cartridge is engaged to the element support such that the annular channel forms a flow channel between the container and the element support, said container entirely enclosing said filter element and allowing fluid communication therewith only via said means for receiving an unfiltered water supply from the element support or said means for discharging filtered water supply to the element support, such that the container forms a pressure vessel in which filtration occurs.

2. The water filter apparatus of claim 1 further comprising a housing removably fitted over the disposable filter cartridge.

3. The water filtering apparatus of claim 1 further comprising a water discharge spigot in fluid communication with the filtered water supply.

4. The water filter apparatus of claim 1 wherein the base further comprises a stand having legs resting on a surface.

5. The water filter apparatus of claim 1 wherein the element support has a connector for connecting the filter cartridge to the base.

6. The water filter apparatus of claim 1 wherein the container comprises an upper part and a lower part threadably engaged for enclosing the filter element therein.

7. The water filter apparatus of claim 1 further comprising a movable filter cartridge support engagable with an end of the filter cartridge and disposed in a facing relation to the base such that the filter cartridge is removably disposed therebetween.

8. The water filter apparatus of claim 7 further comprising a handle for moving the movable support.

9. The water filtering apparatus of claim 1 wherein the container has a threaded passage at the center of the first end and the element support has a threaded projecting pipe connector for mating the container to the element support, and to provide a flow passage therebetween.

* * * * *